United States Patent
Cho et al.

(10) Patent No.: US 7,234,015 B1
(45) Date of Patent: Jun. 19, 2007

(54) PCIXCAP PIN INPUT SHARING CONFIGURATION FOR ADDITIONAL USE AS PCI HOT PLUG INTERFACE PIN INPUT

(75) Inventors: Hanwoo Cho, Acton, MA (US); Richard W. Reeves, Westborough, MA (US); Jelena Ilic, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 105 days.

(21) Appl. No.: 11/151,316

(22) Filed: Jun. 14, 2005

(51) Int. Cl.
*G06F 13/00* (2006.01)
*G06F 13/36* (2006.01)

(52) U.S. Cl. ............... 710/302; 710/104; 710/316; 713/310

(58) Field of Classification Search ............. 710/49, 710/60, 104, 301, 302, 303; 713/300, 500; 702/60; 361/58
See application file for complete search history.

(56) References Cited

U.S. PATENT DOCUMENTS

| | | | | |
|---|---|---|---|---|
| 5,272,584 | A * | 12/1993 | Austruy et al. ............ | 361/58 |
| 5,692,219 | A * | 11/1997 | Chan et al. ................ | 710/49 |
| 5,935,226 | A * | 8/1999 | Klein ....................... | 710/303 |
| 6,185,642 | B1 * | 2/2001 | Beukema et al. .......... | 710/60 |
| 6,792,490 | B2 * | 9/2004 | Tavallaei .................. | 710/104 |
| 6,882,942 | B1 * | 4/2005 | Duduman ................. | 702/60 |
| 6,941,483 | B2 * | 9/2005 | Brown et al. ............. | 713/500 |
| 7,073,078 | B2 * | 7/2006 | Srinivasan et al. ....... | 713/300 |
| 7,076,591 | B2 * | 7/2006 | Arramreddy .............. | 710/302 |
| 7,103,695 | B2 * | 9/2006 | Peil et al. ................. | 710/301 |
| 7,103,703 | B1 * | 9/2006 | Reeves et al. ............. | 710/312 |
| 2005/0149658 | A1 * | 7/2005 | Martin et al. ............ | 710/302 |
| 2005/0223246 | A1 * | 10/2005 | Bacchus et al. .......... | 713/300 |

OTHER PUBLICATIONS

"AMD-3181™ HyperTransport™ PCI-X® Tunnel Data Sheet", 24637 Rev. 3.02, Aug. 10, 2004, pp. 1-87.

\* cited by examiner

*Primary Examiner*—Christopher E. Lee
(74) *Attorney, Agent, or Firm*—Manelli Denison & Selter PLLC; Leon R. Turkevich

(57) ABSTRACT

A method is provided for selectively using a PCIXCAP pin input to detect PCI/PCI-X bus mode or as DC pin input. The method provides a PCI/PCI-X device having PCIXCAP pin input, and a circuit having a plurality of voltage level detection structures and an output corresponding to each voltage level detection structure. Each output is received by a first logic to detect the PCI bus mode of a device defining a first, PCIXCAP mode for the pin input. The method ensures that one of the plurality of voltage level detection structures may be used as a DC signal logic to provide a DC output signal to a second logic. A mode of the PCIXCAP pin input is selected so as to provide the DC output signal under conditions where the PCI/PCI-X bus mode is not being detected. In an embodiment, the DC output signal is used in as a PCI Hot-Plug interface signal.

16 Claims, 4 Drawing Sheets

PCIXCAP PIN INPUT SHARING CONFIGURATION FOR ADDITIONAL USE AS PCI HOT PLUG INTERFACE PIN INPUT

BACKGROUND OF THE INVENTION

1. Field of the Invention

The present invention relates to Peripheral Component Interconnect (PCI) and PCI-X interfaces and, more particularly, to a device having a PCIXCAP pin input and circuitry that selectively enables use of the pin input for detecting PCI/PCI-X bus mode or for generating a DC output signal.

2. Background Art

Peripheral Component Interconnect (PCI) interfaces have been used to provide high-speed connectivity between devices in a multi-device system, such as a processor based system such as a personal computer.

FIG. 1 is a diagram illustrating a conventional implementation of a PCI bus system architecture 100. The system 100 includes a processor 102 coupled to a memory controller 104 via a local bus 106'. The processor 102 and the memory controller 104 are coupled to a PCI local bus 106 (labeled PCI Local Bus #0) via a host bridge 108.

The host bridge 108 provides a low latency path through which the processor 102 may directly access PCI devices 110, for example a network interface card 110a providing access to a local area network 112, a disc drive (SCSI) controller 110b providing access to disk drives 114, an audio card 110c, a motion picture card 110d, or a graphics card 110e configured for driving a monitor 116. The host bridge 108 also provides a high bandwidth path allowing PCI masters on the PCI bus 106 direct access to the system memory 118 via the memory controller 104. A cache memory 120 is independent of the system memory 118 for use by the processor 102.

The term "host bridge" refers to the bridge device 108 that provides access to the system memory 118 for the devices 110 connected to the PCI bus 106. A PCI-to-PCI bridge 122 also may be used to connect a second PCI bus 124 to the PCI bus 106, the second PCI bus 124 configured for connecting other I/O devices 126.

Newer PCI bus protocols are being published, including PCI-X Mode 1 and Mode 2, that provide enhanced PCI functionality. These newer PCI bus protocols include the PCI Local Bus Specification, Rev 2.3, the PCI-X Protocol Electrical and Mechanical Addendum to the PCI Local Bus Specification, Rev. 2.0a, and the PCI-to-PCI Bridge Architecture Specification, Rev 1.2.

The newer PCI host bridge devices may utilize HyperTransport™ technology, which specifies a data rate of 1.6 GHz between each differential signal pair. Hence, the newer PCI bus devices need to be implemented using newer semiconductor fabrication process technology to optimize the higher speed requirements of HyperTransport™ technology.

The PCI-X Specification defines a PCIXCAP pin for detecting a PCI/PCI-X Bus mode. The circuitry associated with the PCIXCAP pin includes voltage level detection logics that determine the type of add-in card that is present. Once the PCI/PCI-X mode is detected, the bus is set to the proper mode. Thus, for example, add-in cards indicate that they are capable of PCI-X operation by connection of the PCIXCAP pin on the add-in card connector.

In addition, a PCI Hot-plug specification has been defined so that electronic components can be installed and/or removed from a PCI bus devices while the computer is running. Typically without the Hot-plug mode, when a card fails, the system (e.g., computer) must be powered off to attend to the failed device. Using the Hot-plug mode, when a card fails, the failure is reported by the system and the individual slot on a PCI bus is selectively powered off to permit the card to be removed from and/or installed into the slot without the need to power off the entire system.

Since support must be provided for different PCI/PCI-X bus modes, a large number of pin inputs are required on an integrated (e.g., single chip) device that detects the bus mode. Thus, there is a need to utilize the PCIXCAP pin input as a DC pin input when the PCIXCAP pin input is not used to detect the mode of PCI-PCI-X operation.

SUMMARY OF THE INVENTION

An object of the present invention is to fulfill the need referred to above. In accordance with the principles of the present invention, this objective is achieved by providing a method of selectively using a PCIXCAP pin input to detect PCI/PCI-X bus mode or as DC pin input. The method provides a PCI device having a PCIXCAP pin input, and a circuit having a plurality of voltage level detection structures, each providing an output to a first logic to determine the PCI bus mode of a device. The method ensures that one of the plurality of voltage level detection structures may be used as a DC signal logic to provide a DC output signal to a second logic. A mode of the PCIXCAP input pin is selected so as to provide the DC output signal under conditions where the PCI/PCI-X bus mode is not being detected.

In accordance with another aspect of the invention, a method is provided for selectively using a PCIXCAP pin input to detect PCI/PCI-X bus mode or as PCI Hot-Plug interface pin input. The method provides a PCI device having PCIXCAP pin input, and a circuit having a plurality of voltage level detection structures and an output corresponding to each voltage level detection structure, each output being received by first logic to determine the PCI/PCI-X bus mode of a device defining a first, PCIXCAP mode of the pin input. The method ensures that one of the plurality of voltage level detection structures may be used as a DC signal logic to provide a DC output signal to a second logic for use as an interface signal for PCI Hot-Plug thereby defining a second mode for the pin input. The mode of the pin input is selected to be the first or second mode.

In accordance with yet another aspect of the invention, a PCI device includes a PCIXCAP pin input; a plurality of voltage level detection structures each providing an output signal; a first logic receiving each output signal, for determining, via the pin input, a PCI/PCI-X bus mode of a device; a second logic receiving one of the output signals; and a gate receiving the one output signal and an enable signal, the enable signal controlling passing of the one output signal through the gate.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

The disclosed embodiment is an arrangement for using a PCIXCAP pin input to provide a DC output for PCI Hot-Plug Mode and will be described in detail following an overview of the architecture of the HyperTransport™ tunnel/PCI-X bridge.

ARCHITECTURE OVERVIEW

Figure 1:
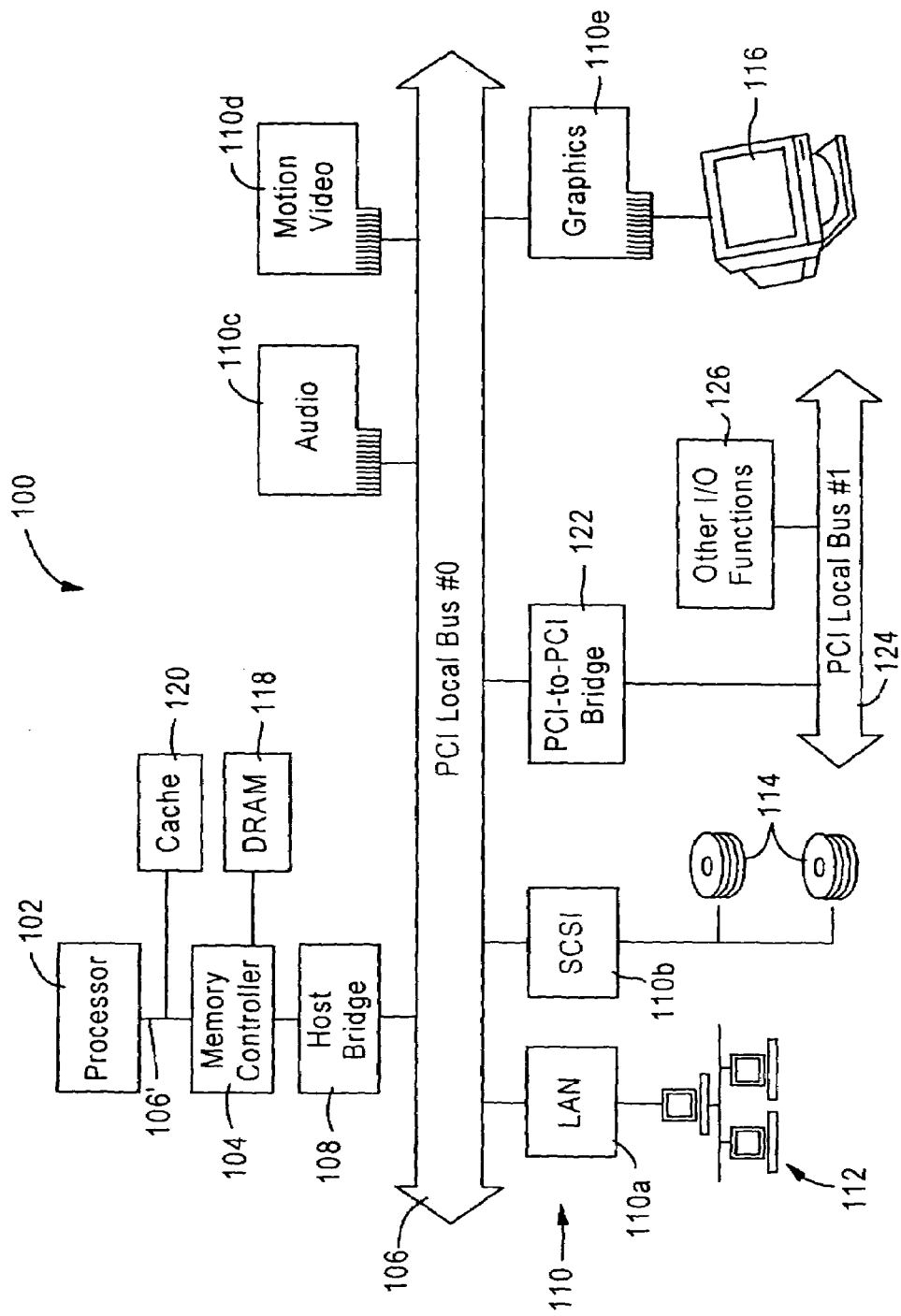
FIG. 1 is a block diagram of a conventional (PRIOR ART) implementation of a PCI based system.
Figure 2:
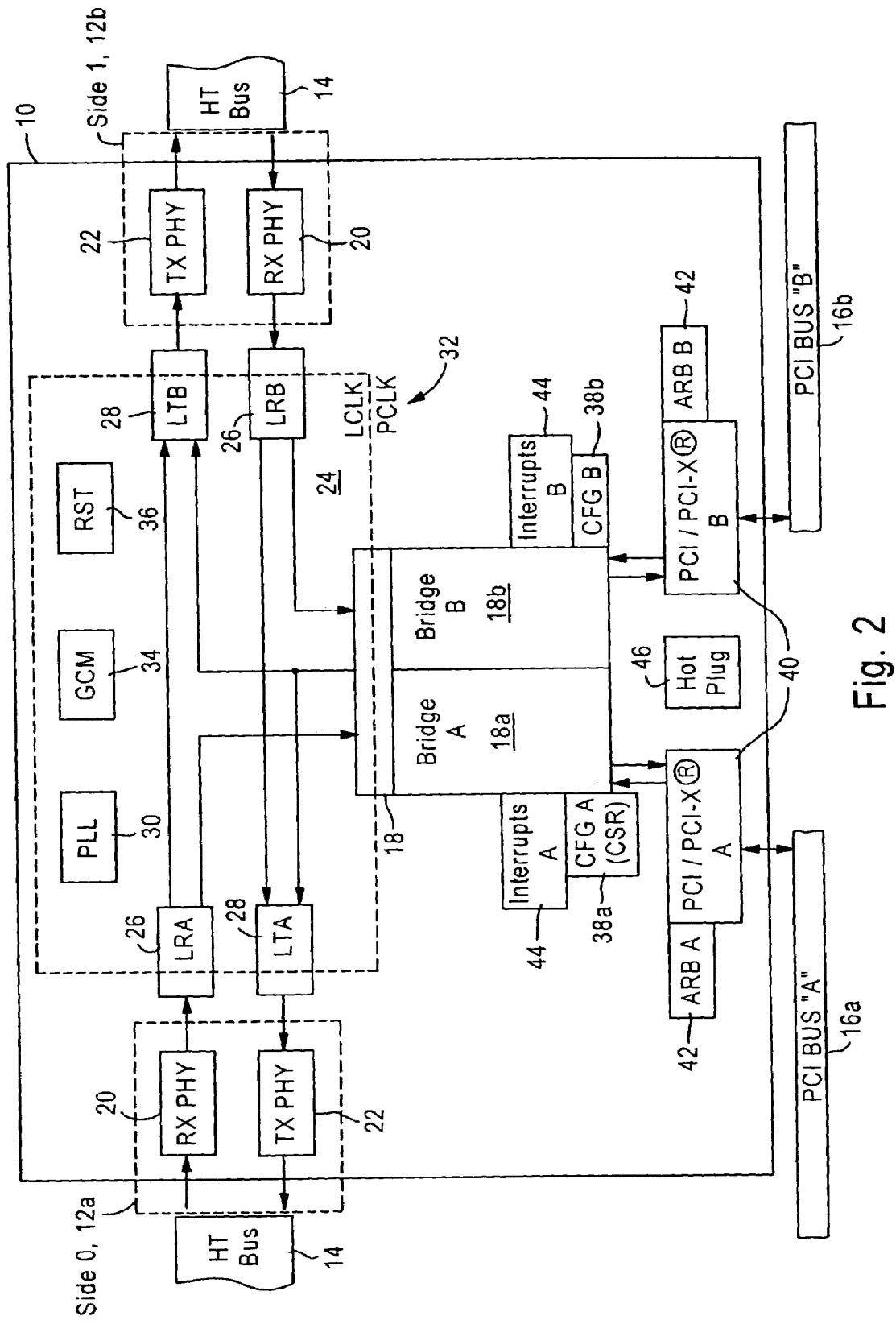
FIG. 2 is a block diagram of a PCI/PCI-X host bridge device according to an embodiment of the present invention.

FIG. 2 is a diagram illustrating the transport tunnel-to-PCI host bridge device 10, according to an embodiment of the present invention. The transport tunnel-to-PCI host bridge device 10, preferably implemented as an integrated circuit on a single chip, is configured for operating as a HyperTransport™ (HT) tunnel device according to the HyperTransport™ IO Link Specification, Rev. 2.0, including errata up to specification Rev. 1.05c.

The transport tunnel-to-PCI host bridge device 10 includes two HT interfaces 12a and 12b labeled "Side 0" and "Side 1", respectively. HT packets received by a given interface (e.g., 12a) from an HT bus 14 can be passed through the device 10 to the other interface (e.g., 12b) (i.e., tunneled), enabling multiple HT tunnel devices to be connected serially (e.g., a daisy-chain arrangement) to form an HT chain on the bus 14 for transfer of HT packets.

The following nomenclature may assist in describing connections in serially connected HT tunnel devices. The HT interface (e.g., 12a) that is connected to (or toward) a HyperTransport™ host device (e.g., a host memory controller) is referred to as the "upstream" interface, and the other HT interface (e.g., 12b) is referred to as the "downstream" interface: if the upstream interface (e.g., 12a) is directly connected to the HyperTransport™ host device via the corresponding connected HT tunnel 14, then that tunnel connecting the upstream interface to the HyperTransport™ host device is referred to as the "upstream link"; if the upstream interface (e.g., 12a) is connected to a second HT device via an HT tunnel, where the second HT device provides a connection to (or toward) the HyperTransport™ host device, then that HT tunnel connecting the upstream interface and the second HT device is referred to as the "upstream tunnel". Note that the downstream interface may or may not be connected to another HT device or chain of devices.

The transport tunnel-to-PCI host bridge device 10 also provides bridging operations between the HT bus 14 and PCI buses 16a and/or 16b. In particular, the transport tunnel-to-PCI host bridge device 10 contains two independent HT-to-PCI-X bridges 18a and 18b in accordance with the HyperTransport™ Link Specification, Rev. 2.0, the PCI Local Bus Specification, Rev 2.3, the PCI-X Protocol Addendum to the PCI Local Bus Specification, Rev. 2.0a, and the PCI-to-PCI Bridge Architecture Specification, Rev 1.2. The transport tunnel-to-PCI host bridge device 10 includes configurable registers (38a, 38b) that identify the address ranges utilized by each of the PCI bus 16a, the PCI bus 16b, and the HT bus 14.

Also note that the device 10 may identify a destination for a received HT packet based on a device identifier and bus identifier specified in the HT packet; alternately the device 10 may be configured to identify a destination bridge (e.g., 18a, 18b) based on a corresponding unit identifier (e.g., 181, 182) according to HyperTransport™ protocol. In addition, the transport tunnel-to-PCI host bridge device 10 includes configuration (CFG) registers 38a, 38b: the configuration register 38a includes command and status registers (CSRs) within prescribed address spaces used by the transport tunnel-to-PCI host bridge device 10 for internal configuration, in accordance with the above-described PCI and HyperTransport™ specifications. Hence, the transport tunnel-to-PCI host bridge device 10 can store configuration information to an addressable CSR based on identifying an HT packet specifying a device identifier for the device 10.

Hence, the transport tunnel-to-PCI host bridge device 10 can either tunnel HT packets received from the HT bus 14 by passing the packets from one interface (e.g., 12a) to the other interface (e.g., 12b), or the transport tunnel-to-PCI host bridge device 10 can pass the HT packets to one of the PCI buses 16a or 16b via the corresponding bridge 18a or 18b. Also note that the transport tunnel-to-PCI host bridge device 10 can process and respond to a received HT packet that is destined for the transport tunnel-to-PCI host bridge device 10 (e.g., for storage of configuration data).

The bridges 18a and 18b of the transport tunnel-to-PCI host bridge device 10 also forward onto the HT bus 14 any data having been received from the respective PCI buses 16a or 16b that specify a destination address within the prescribed address range specified within the CSRs for the HT bus 14.

Each of the HT interfaces 12a and 12b includes a receive physical layer transceiver (RX PHY) 20 and a transmit physical layer transceiver (TX PHY) 22. Each of the PHYs 20 and 22 include synchronization First-in-First-out (FIFO) registers for buffering packets according to a prescribed HT clock domain, and compensation circuitry to ensure electrical compliance with the HyperTransport™ specification. In particular, the RX PHY receives a packet and a clock associated with the packet according to the HT clock domain on the bus 14; the FIFO registers in the PHYs 20 and 22 are used to transition between the HT clock domain and a local clock (LCLK) domain 24.

The device 10 includes a local clock (LCLK) domain 24 that relies on a clock that is independent of any variations in clocks driven by the HT bus 14. The device 10 includes, within the local clock domain 24, receive logic 26 and transmit logic 28 for each of the HT interfaces 12 and 12b. The device also includes a phase locked loop (PLL) circuit 30 configured for generating the local clock (LCLK) and a phase-controlled clock (PCLK) 32, and maintaining synchronization of those clocks as needed.

The receive logic 26 is configured for determining whether a received HT packet from the HT bus 14 should be forwarded to the corresponding transmit logic 28 for tunneling of the HT packet, whether the received HT packet should be forwarded to the bridge 18 for internal configuration of the device 10, or forwarded to the bridge 18 for transfer of the received HT packet onto a determined one of the PCI buses 16a or 16b.

The device 10 also includes within the local clock domain a link interface cycle manager (GCM) 34. The GCM 34 is configured for arbitrating the order of transactions that are to occur within the local clock domain 24. For example, the GCM 34 may arbitrate between transactions that are to be output by the transmit logic (LTA) 28. The reset logic (RST) 36 is configured for managing reset and device initialization operations, including implementing test and diagnostic modes.

The HT-to-PCI bridge 18 is configured for transferring HT packets, forwarded from the HT bus 14 by one of the receive logic blocks (e.g., LRA or LRB) 26, to one of the PCI buses 16a or 16b. In particular, the receive logic block 26 having received the HT packet will specify to the bridge 18 the PCI bus (e.g., 16a) on which the HT packet is to be output. The HT-to-PCI bridge 18 also is configured for transferring packets from one of the PCI buses 16a or 16b to one of the transmit logic blocks (e.g., LTA or LTB) 28 for output onto the HT bus 14. The bridge 18 (e.g., the bridge 18a) identifies the destination address of the HT packet as falling within the address range of either the PCI bus (e.g., 16a) or the configuration space of the configuration register (e.g., 38a), and forwards the packet accordingly.

The device 10 also includes, for each PCI bus (e.g., 16a, 16b), a bridge 18a and 18b, the configuration registers 38a and 38b, a PCI interface module 40, a PCI arbitration module 42, and an interrupt controller 44. The device 10 also includes a hot plug module 46. The configuration registers 38a and 38b include registers, addressable via the HT bus 14, for configuration of the respective components associated with bus operations for the respective PCI buses 16a and 16b. Each PCI interface module 40 is configured for transmitting and receiving PCI data bursts according to the above-identified PCI specifications. Each PCI arbitration module 42 is configured for managing PCI bus arbitrations for the corresponding attached PCI bus (e.g., 16a or 16b), including identifying a bus master for PCI bus transactions. Each interrupt controller 44 is configured for servicing interrupts detected on the corresponding PCI bus (e.g., 16a or 16b), as well as interrupts generated according to prescribed I/O Advanced Programmable Interrupt Controller (IOAPIC) specifications. Hence, various interrupt methods may be implemented in the interrupt controllers 44.

The hot plug module 46 is configured for managing hot plug operations based on prescribed configuration registers in the registers 38a and/or 38b, where a selected PCI slot or device can be powered down while the device 10, as well as other PCI devices on the PCI bus, remain in a powered state. For example, the hot plug module 46 may include logic that is compliant with the Standard Hot Plug Circuitry (SHPC) specified in the above-described PCI specifications; alternative implementations also may be included in the hot plug module 46, for example logic configured for interfacing with commercially-available power controllers, including the TPS2340A or the TPS2342 power controllers commercially available from Texas Instruments, Inc.

Using PCIXCAP Pin Input for DC Pin Input in PCI Hot-Plug Mode

Figure 3:
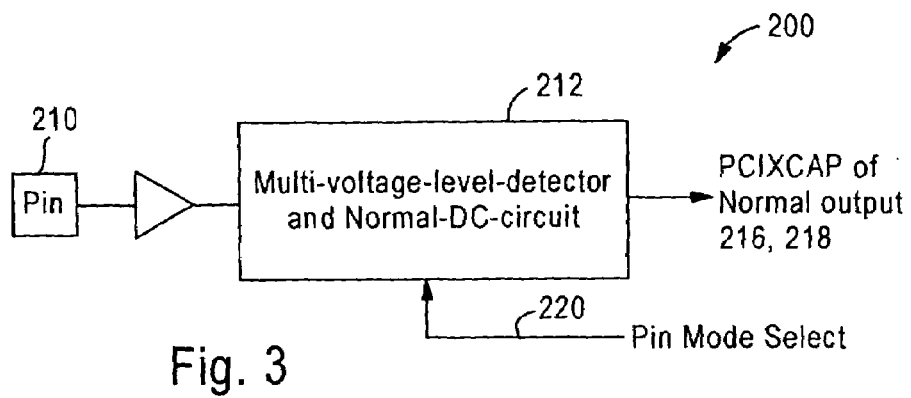
FIG. 3 is a block diagram of a PCI/PCI-X device that selectively provides PCIXCAP output signal or a DC output signal in accordance with the invention.

FIG. 3 is a diagram illustrating a PCI/PCI-X device 200, according to an embodiment of the invention that is preferably included in the PCI interface module 40 described above (FIG. 2).

The device 200 includes a pad or PCIXCAP pin input 210 and an operational circuit 212. The PCIXCAP pin input 210 is used by internal logic to detect the PCI/PCI-X Bus mode. In general, and with reference to FIG. 4, the conventional circuitry associated with the pin input 210 is an analog multi-voltage level detector and includes four voltage level detection logics (e.g., operational amplifiers) U1, U2, U3 and U4 and four outputs OUT1, OUT2, OUT3 and OUT4. The outputs of the four voltage level detection logics are provided as inputs to internal logic 213 for determining the type of add-in card 110 that is present (e.g., detecting the PCI/PCI-X bus mode) in the conventional manner. In this implementation, the system pulls up PCIXCAP with a single resistor and compares the voltage on PCIXCAP to four thresholds.

In PCI/PCI-X systems, this circuitry uses main power that is continuously on so that the capability of the card 110 is determined while slot power is off. In PCI Hot-Plug mode configurations, the PCIXCAP pin on an add-in card is connected to the power controllers such as the TPS2340A or the TPS2342 and thus the pin input 210 to a central PCI device is not used. Thus the pin input 210 can be employed for another function, such as for providing a DC output signal as an input for the Hot-Plug interface.

Figure 4:
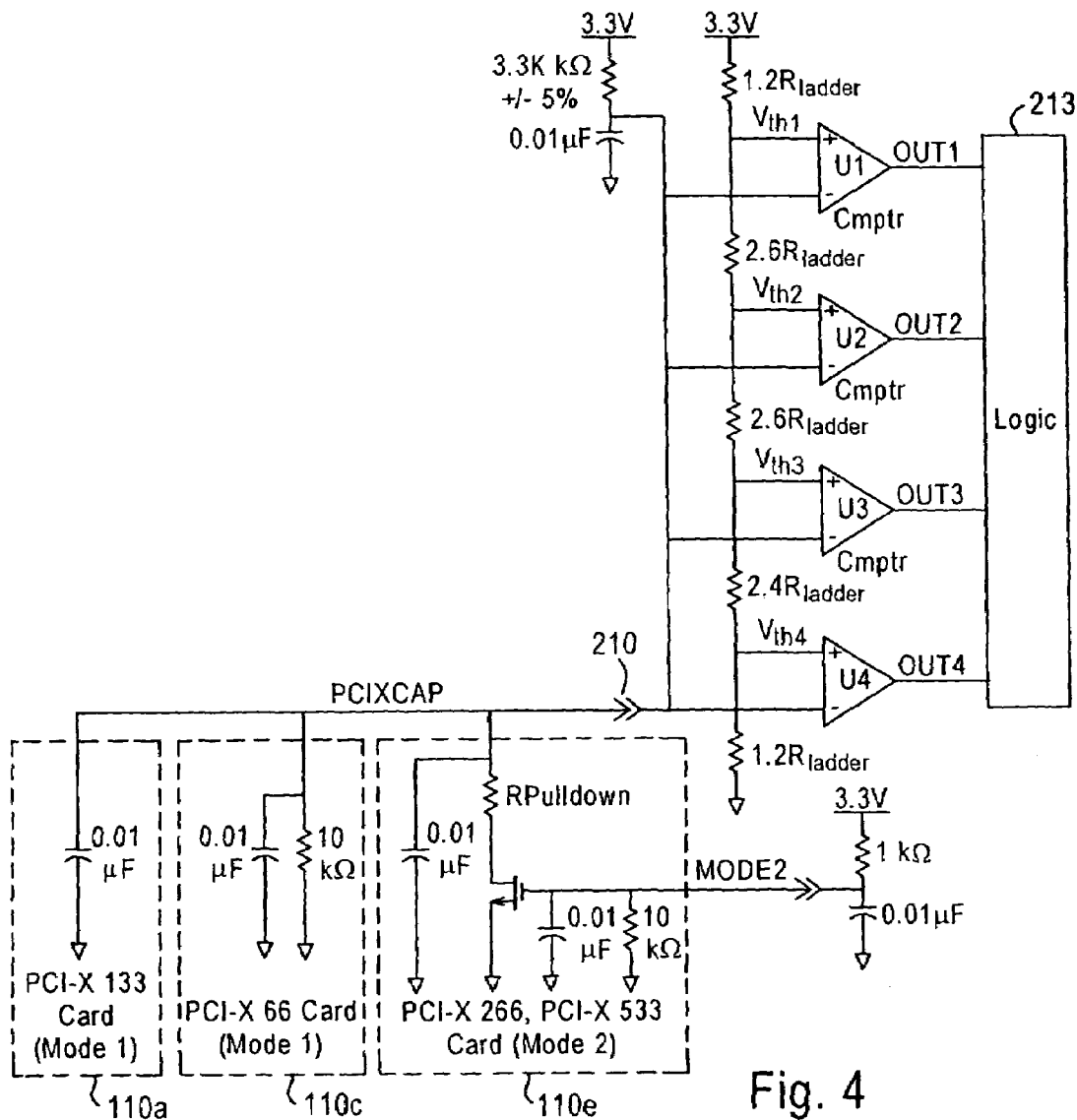
FIG. 4 shows a conventional (PRIOR ART) PCIXCAP pin input circuit.
Figure 5:
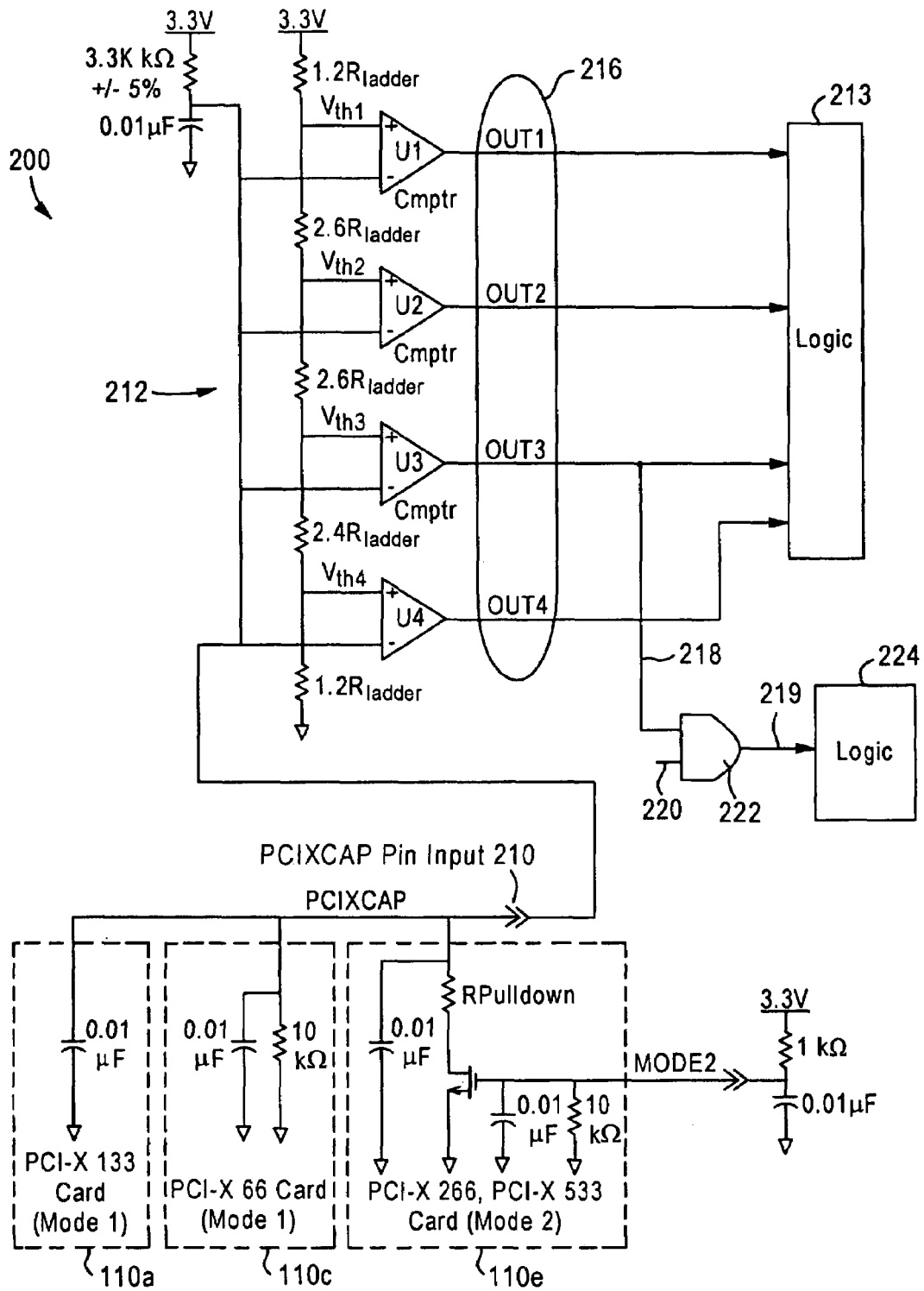
FIG. 5 shows the PCIXCAP pin input circuit of FIG. 4 modified in accordance with the invention.

Thus, with reference to FIG. 5, in the embodiment, the circuit of FIG. 4 has been modified so that one (e.g., U3) of the four voltage level detection logics is used as a normal DC signal sensing logic. An output signal 218 from U3 is received at an AND gate 222, which may pass the signal to the internal logic 224. Thus, PCIXCAP pin input 210 can be used as a normal DC input signal pin input when the PCIXCAP pin input is not needed to provide an input (e.g., signal 216) to the internal control logic 213.

In the embodiment, the DC input signal 219 provides an input signal to the internal logic 224 for use as a Hot-Plug interface signal, but it can be appreciated that the signal 219 can be used for other purposes. Any of the respective outputs from U1, U2, U3 and U4 can be used for another purpose when the PCXICAP function is not employed but, in the embodiment, the output of U3 is employed so that the signal received by the internal logic 224 is a normal 3.3 V CMOS signal used as one interface signal between an external Hot-Plug controller (not shown) and a central PCI device.

Thus, the designer of the integrated circuit 200 can configure, via pin select mode or enable signal 220, the operating circuit 212 to provide or to eliminate the Hot-plug signal (e.g., the DC signal 218). As shown in FIG. 5, the signal 220 is provided to the gate 222 that determines whether signal 218 is enabled or disabled. Hence, the selection of the function as either Hot-plug capable or non Hot-plug capable is decided at the time of configuration of the system. Thus, the integrated circuit 200 can be employed in a Hot-plug mode system or in a non-Hot plug mode system. Since the PCIXCAP pin input 210 is used for two different functions, the number of required pins and pin inputs is reduced.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of selectively using a PCIXCAP pin input to detect PCI/PCI-X bus mode or as DC pin input, the method including:

providing a PCI/PCI-X device having PCIXCAP pin input, and a circuit having a plurality of voltage level detection structures, each providing an output for use by a first logic to determine the PCI/PCI-X bus mode of a device, ensuring that one of the plurality of voltage level detection structures may be used as a DC signal logic to provide a DC output signal, and selecting a mode of the PCIXCAP pin input so as to provide the DC output signal to a second logic under conditions where the PCI/PCI-X bus mode is not being detected.

2. The method of claim 1, wherein each voltage level detection structure is an operational amplifier.

3. The method of claim 2, wherein four operational amplifiers are provided.

4. The method of claim 1, wherein the step of selecting a mode provides an AND gate that receives the DC output signal and that receives an enable signal, the enable signal controlling passing of the DC output signal through the gate.

5. The method of claim 1, wherein, after the selecting step, the method further includes using the DC output signal as an interface signal for a PCI Hot-Plug.

6. The method of claim 5, wherein the DC output signal is approximately 3.3 V.

7. A method of selectively using a PCIXCAP pin input to detect PCI/PCI-X bus mode or as PCI Hot-Plug interface pin input, the method including:

providing a PCI/PCI-X device having PCIXCAP pin input, and a circuit having a plurality of voltage level detection structures and an output corresponding to each voltage level detection structure, each output being received by a first logic to determine the PCI/PCI-X bus mode of a device defining a first mode for the PCIXCAP pin input, ensuring that one of the plurality of voltage level detection structures may be used as a DC signal logic to provide a DC output signal to a second logic as an PCI Hot-Plug interface signal thereby defining a second mode for the PCIXCAP pin input, and selecting a mode of the PCIXCAP pin input to be one the first and second modes.

8. The method of claim 7, wherein each voltage level detection structure is an operational amplifier.

9. The method of claim 8, wherein four operational amplifiers are provided.

10. The method of claim 7, wherein the step of selecting a mode provides an AND gate that receives the DC output signal and that receives an enable signal, the enable signal controlling passing of the DC output signal through the gate.

11. The method of claim 7, wherein the selecting step selects the second mode under conditions where the PCI/PCI-X bus mode is not being detected.

12. The method of claim 7, wherein the DC output signal is approximately 3.3 V.

13. A PCI/PCI-X device comprising:

PCIXCAP pin input, a plurality of voltage level detection structures each providing an output signal, a first logic receiving each output signal, for determining, via the pin input, a PCI/PCI-X bus mode of a device, a second logic receiving one of the output signals, and a gate receiving one output signal and an enable signal, the enable signal controlling passing of the one output signal through the gate.

14. The device of claim 13 wherein each voltage level detection structure is an operational amplifier.

15. The device of 14, wherein four operational amplifiers are provided.

16. The device of claim 13, wherein the one output signal is approximately 3.3 V.

* * * * *